United States Patent Office 3,286,484
Patented Nov. 22, 1966

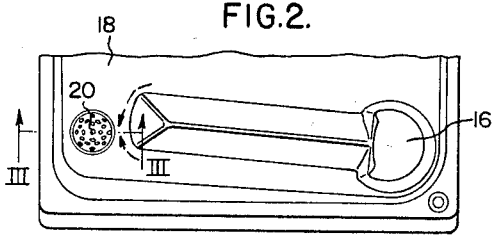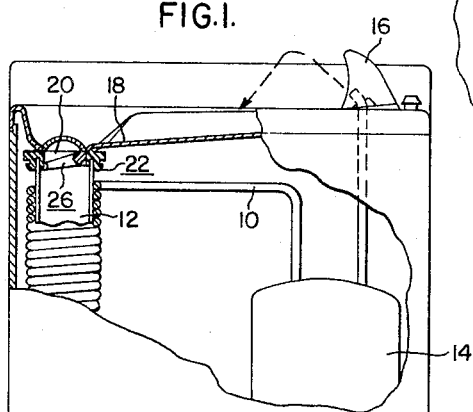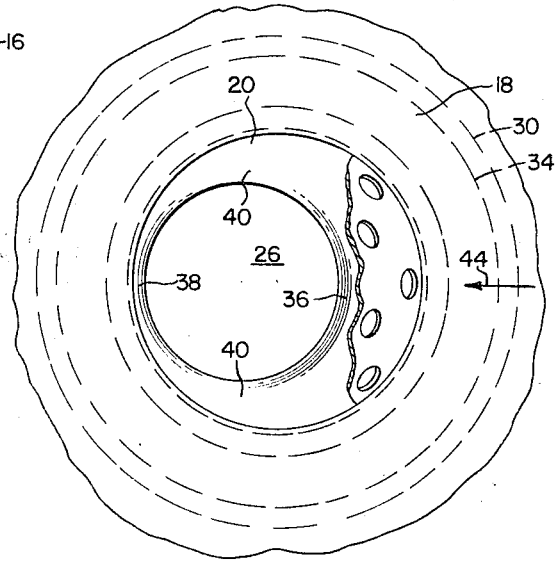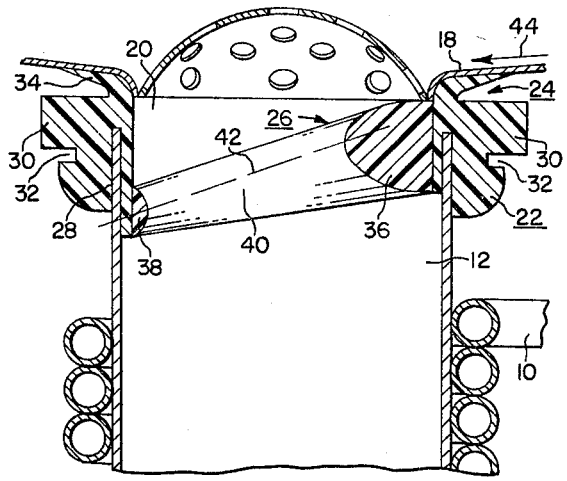
INVENTORS
Charles F. Ter Bush
& Edward H. Donselman

3,286,484
WATER COOLER
Charles F. Ter Bush, Grove City, and Edward H. Donselman, Upper Arlington, Columbus, Ohio, assignors to Westinghouse Electric Corporation, Pittsburgh, Pa., a corporation of Pennsylvania
Filed May 6, 1965, Ser. No. 453,753
9 Claims. (Cl. 62—391)

This invention relates principally to water coolers of the drinking fountain type.

It is conventional in electric water coolers to provide an arrangements in which the waste water draining from the water coolers is used to precool the supply water for the fountain or bubbler part of the water cooler. Typically this is accomplished by bringing the supply water into heat exchanging relation with the vertical drain pipe in the water cooler before passing the supply water into the mechanically refrigerated cooling chamber immediately preceding the bubbler. One effective way of obtaining the heat exchange between the waste water flowing down the drain pipe, and the supply water flowing upwardly through a supply tube helically wound around the drain pipe, is to provide a helically descending runner or shelf along the inner face of the drain pipe. Thus, the water passing into the drain pipe from the water cooler basin flows along the descending helical path along the inner surface of the drain pipe at a sufficiently low velocity to extract substantial heat from the ascending supply water. While this arrangement does provide adequate precooling of the supply water, it has attendant disadvantages.

The first, and perhaps most serious disadvantage, is that some persons concerned with such matters contend that the helical shelf arrangement obstructs the drain pipe enough to violate, in their opinion, local health codes regarding plumbing standards. A more prosaic objection, although not necessarily so from manufacturer's standpoint, is that the helical runner arrangement is fairly costly. A still further objection is that the helical runner arrangement may, if improperly made or installed, result in pockets being formed along the runner where the waste water can pool.

Accordingly, the object of this invention is the provision of a water cooler in which the foregoing disadvantages are substantially avoided.

A more specific object is the provision of a water cooler having a precooling arrangement which is nearly as effective in its precooling function, but which is of substantially simplified structure as compared to the helical runner arrangement.

In accordance with the invention, a precooling arrangement is provided in which a water spreader ring is mounted at the top of the drain pipe and which functions to distributed the waste water generally uniformly about the inner face of the drain pipe so that it flows down that face more or less as a film or layer of water contacting the entire face. Thus, the extraction of heat from the drain pipe walls and proportionately from the supply water tube wound around the drain pipe wall is promoted. The arrangement, to be more specific, includes a ring mounted in oblique relation to the axis of the drain pipe and having curved surfaces projecting inwardly toward the axis of the drain pipe, with the ring being formed with the portion at the highest level having a curved surface perimeter of the greatest length, and portions of the ring at descending levels having curved surface perimeters of diminishing lengths. Thus, the upper portion provides a substantially longer flow path for the waste water than the lower portions. The upper portion of the ring is located at the side of the drain which normally receives the heaviest flow of waste water from the bubbler.

The invention will be described in connection with the accompanying drawing in which one embodiment of the invention is shown by way of example, and wherein:

FIGURE 1 is a fragmentray, partly-broken front view of a water cooler according to the invention;

FIG. 2 is a fragmentary top view of the water cooler of FIG. 1;

FIG. 3 is a fragmentary vertical section corresponding to one taken along the line III—III of FIG. 2; and FIG. 4 is a top view of the water spreader element and mounting assembly therefor.

The casing of the water cooler illustrated in FIG. 1 is broken away in part to expose some of the interior parts of the cooler of significance in connection with the invention. As there shown, the water supply tube 10 is helically wound about the vertically-disposed drain pipe 12 and then extends over to a refrigerated cooling chamber 14. Chilled supply water flows from the chamber to the bubbler or fountain nozzle 16 mounted on a top corner of the waste water catch basin 18. The drinking water is discharged from the nozzle 16 in the direction and in an arc indicated by the broken line arrows of FIGS. 1 and 2. The water which is not collected or consumed drains along the shaped top surface of the catch basin to the drain outlet 20 located above the upper end of the drain pipe 12.

The spreader ring and mounting assembly generally designated 22 in FIG. 1 is interposed between the drain outlet 20 and the drain pipe 12. Its function, as previously noted, is to distribute the waste water about the top inner surface of the drain pipe as a relatively uniform film for its descending passage out of the cooler.

The general configuration of the spreading ring assembly is best shown in FIGS. 3 and 4. The assembly includes a radially outer mounting and sealing part 24, and the radially inner spreader ring 26. The mounting part includes a vertically-disposed annular slot 28 into which the upper rim of the drain pipe 12 is received to seal the assembly to the pipe and prevent leakage of waste water. The horizontal rim 30, overlying the horizontally disposed annular slot 32, may be used as a seat for further supporting the assembly. In the currently preferred embodiment, an upwardly and outwardly directed skirt 34 of resilient material is provided at the top of the assembly to seal against the underside of the basin around the drain. This skirt is of diminishing cross section in the outer direction, and forms the seal when it is pushed down from an upwardly unstressed position to the illustrated depressed position.

The spreader ring 26 is located within the mounting and sealing part 24 of the assembly in oblique or tilted relation to a horizontal plane normal to the axis of the vertical drain pipe. The inwardly projecting surfaces of the ring are curved and the upper portion 36 of the spreader ring has a substantially enlarged cross-sectional area as compared to the lower portion 38 of the spreader ring. Accordingly, the curved surface perimeter of the upper portion, as measured in a vertical direction, is substantially greater than the perimeter of the lower portion curved surface. The intermediate portions generally designated 40 between the upper and lower portions have curved surface portions of diminishing perimeter in a descending direction.

In the currently preferred embodiment, the curved surface of the upper portion has a generally parabolic shape in vertical section, and the lower portion curved surface has a semicircular shape in vertical section. Thus the upper face of the parabolic shaped upper portion descends less sharply than the upper face of the semicircular lower portion. The intermediate portions 40 provide curved surfaces making a smooth transition from the parabolic shape to the semicircular shape, and accordingly also have generally parabolic shapes with a diminishing ratio of horizontal radius to base vertical height. The currently preferred arrangement is dimensioned to provide a ratio between the upper portion curved surface perimeter to lower portion curved surface perimeter in the order of 3 to 1.

The preferred degree of tilt of the spreading ring 26 with respect to a plane normal to the axis of the drain pine is in the order of between 15 and 25 degrees. This angle is measured between a horizontal plane and a plane passing through an inner center line of the ring. Such an imaginary plane is indicated by the broken line 42 of FIG. 3.

For the proper functioning of the spreader ring, it is important that the upper, larger portion 36 of the spreader ring be disposed at the side of the drain outlet which receives the heaviest flow of waste water under normal operating conditions. This direction of normal flow is indicated by the arrows 44 of FIG. 3. It will be appreciated of course that water cooler bubblers are usually adjusted so that under normal water pressure the stream arc is sufficiently low to prevent water from overshooting the drain outlet.

It is further very desirable for the proper functioning of an arrangement according to the invention that the surface of the water spreader ring be hydrophilic, i.e., wettable, so that the water flowing over the spreader ring will tend to spread out and flow evenly along the surface of the ring. Examples of a plastic and a metal which display this characteristic are sulfonated polystyrene, and brushed brass.

In the operation of the arrangement according to the invention, the heaviest waste water flow is initially received by the upper portion 36 of the spreader ring. The tilt of the spreader ring, coupled with the diminishing curved surface lengths of the intermediate and lower portions of the spreader ring, results in a substantial part of the waste water flowing around the spreader ring rather than directly flowing down around the upper portion surfaces of the ring. Thus, the spreader ring directs and distributes part of the water around the ring before it flows down the inner surface of the drain tube. The relatively uniform film of water enhances the heat exchange between this water and the supply water passing upwardly around the exterior of the drain tube. This is accomplished without forming any troughs in which water can pool since the upper rim of all curved surface portions is either level or inclined downwardly.

We claim as our invention:

1. A water cooler including:
   a water bubbler discharging into a catch basin;
   a drain outlet in said basin, said outlet being disposed to normally receive the major portion of waste water from said bubbler along one side;
   a drain pipe connected to said outlet;
   water supply means for said bubbler, said water supply means extending in heat exchange relation with the exterior of said drain pipe; and
   a ring constructed to have the general shape of the inner peripheral portion of a torus, obliquely disposed adjacent the upper end of said pipe for spreading waste water generally uniformly around the inner surface of said pipe to precool said water supply means, the inwardly-facing curved surfaces of said inner peripheral portion of said ring being of diminishing perimeter, as measured in a vertical plane, in a descending direction, the curved surface of largest perimeter being located at the side of said outlet normally receiving the heaviest flow of said waste water.

2. A water cooler including:
   a water bubbler discharging into a catch basin;
   a drain outlet in said basin, said outlet being disposed to normally receive the major portion of waste water from said bubbler along one side;
   a drain pine connected to said outlet;
   a water supply means for said bubbler, said water supply means extending in heat exchange relation with the exterior of said drain pipe; and
   ring means obliquely disposed closely below said outlet adjacent the upper end of said pipe for spreading waste water generally uniformly around the inner surface of said pipe, the upper portion of said ring being located at the side of said outlet normally receiving the heaviest flow of said waste water, and the lower portion of said ring being located against the opposite side, said upper portion presenting an inwardly-facing convex surface of substantially greater extent than the inwardly-facing convex surface presented by said lower portion.

3. A water cooler according to claim 2 in which:
   said upper portion has a generally parabolic shape in vertical section, and said lower portion has a generally circular shape in vertical section.

4. A water cooler according to claim 2 in which:
   each of said convex surfaces has a highest level coinciding with the extreme outer edge of said ring.

5. A water cooler according to claim 2 in which:
   the ratio of curved surface perimetric length, as measured in a vertical direction, of said upper portion to said lower portion is in the order of 3 to 1; and
   said ring means is tilted, as measured between a horizontal plane and a plane passing through a center line encircling the exterior of said ring, in the order of between 15 and 25 degrees.

6. An arrangement in a water cooler for spreading waste water about the inner surface of the drain pipe of the water cooler to promote precooling of supply water conveyed in heat transfer relation past the outer surface of the drain pine to a bubbler, comprising:
   a spreader ring constructed to have the general shape of the inner peripheral portion of a torus, adjacent the upper end of said drain pipe, said ring being tilted with respect to a plane normal to the axis of said drain pipe, said ring having conic surface areas projecting inwardly toward said axis of said pipe, the upper portion of said ring being located at the side of said pipe normally receiving the heaviest flow of said waste water and providing a substantially longer flow path, in a vertical direction, than the lower portion of said ring located at the opposite side of said pipe.

7. A water spreading arrangement as specified in claim 6 wherein:
   said upper portion of said ring is generally parabolic in vertical section, and said lower portion is generally semicircular in vertical section.

8. A water spreading arrangement as specified in claim 7 wherein:
   the vertical dimension of said upper portion of said ring is in the order of 1½ times the vertical dimension of said lower portion.

9. A water spreading arrangment as specified in claim 7 wherein:
the ratio of curved surface perimetric length, as measured in a vertical direction, of said upper portion to said lower portion of said ring is in the order of 3 to 1; and
said ring is tilted, as measured between a horizontal plane and a plane passing through a center line encircling the exterior of said ring, in the order of 20 degrees.

References Cited by the Examiner
UNITED STATES PATENTS

| | | | |
|---|---|---|---|
| 2,650,800 | 9/1953 | Taylor | 62—391 X |
| 3,086,373 | 4/1963 | Freer | 62—391 X |

FOREIGN PATENTS

| | | |
|---|---|---|
| 482,337 | 4/1952 | Canada. |

References Cited by the Applicant
UNITED STATES PATENTS

| | | |
|---|---|---|
| 2,577,574 | 12/1951 | Freer. |

LLOYD L. KING, *Primary Examiner.*